(12) United States Patent
Hasegawa

(10) Patent No.: US 12,447,555 B2
(45) Date of Patent: Oct. 21, 2025

(54) PROCESSING APPARATUS AND ARTICLE MANUFACTURING METHOD

(71) Applicant: CANON KABUSHIKI KAISHA, Tokyo (JP)

(72) Inventor: Saori Hasegawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 153 days.

(21) Appl. No.: 18/465,545

(22) Filed: Sep. 12, 2023

(65) Prior Publication Data

US 2024/0109151 A1    Apr. 4, 2024

(30) Foreign Application Priority Data

Sep. 29, 2022  (JP) .................................. 2022-156073

(51) Int. Cl.
*G02B 26/08* (2006.01)
*B23K 26/06* (2014.01)
*B23K 26/073* (2006.01)

(52) U.S. Cl.
CPC ........ *B23K 26/073* (2013.01); *B23K 26/0648* (2013.01); *B23K 26/0665* (2013.01)

(58) Field of Classification Search
CPC .............. B23K 26/073; B23K 26/0648; B23K 26/0665; G02B 26/0816; G02B 26/0875
See application file for complete search history.

(56) References Cited

U.S. PATENT DOCUMENTS 6,262,793 B1 * 7/2001 Sasaya ................... G02B 13/24
 355/53
2003/0128333 A1    7/2003 Fukuma et al.

FOREIGN PATENT DOCUMENTS

JP        2002273589 A       9/2002

* cited by examiner

*Primary Examiner* — Euncha P Cherry
(74) *Attorney, Agent, or Firm* — ROSSI, KIMMS & McDOWELL LLP

(57) ABSTRACT

In order to make a processing beam close to a circular shape, in a processing apparatus including an optical device that guides a laser beam emitted from a light source to a target object and processing the target object with light emitted from the optical device, the optical device includes a correction mechanism that corrects rotationally asymmetric optical characteristics of the optical device, the correction mechanism includes at least two optical elements with rotationally asymmetric power, and a mechanism that enables the at least two optical elements to rotate about their respective optical axes, the amount of rotationally asymmetric optical characteristics changes due to a rotation angle difference between the at least two optical elements, and a direction of the rotationally asymmetric optical characteristics changes depending on a common rotation angle of the at least two optical elements.

10 Claims, 6 Drawing Sheets

PROCESSING APPARATUS AND ARTICLE MANUFACTURING METHOD

BACKGROUND OF THE INVENTION

Field of the Invention

The present invention relates to a processing apparatus using a laser, an article manufacturing method, and the like.

Description of the Related Art

As an optical device of the related art, there is an optical device illustrated in FIG. 6. FIG. 6 is a diagram illustrating a processing apparatus of the related art. Laser light emitted from a laser light source LS passes through an optical device 500 and then is emitted to a target object 10.

The optical device 500 includes an inclination adjustment mechanism 1 that inclines an incident optical axis of a laser beam with respect to a target object at an arbitrary angle, and a focus position adjustment mechanism 2 that shifts a focus position of a laser beam to an arbitrary position in the optical axis direction. The optical device 500 also includes a position adjustment mechanism 3 that shifts an incident optical axis position of a laser beam with respect to a target object to an arbitrary position, and a light condensing mechanism 4 that has a function of condensing a laser beam.

In order to perform finer processing using the optical device 500, a technique for shortening a processing laser wavelength, increasing the NA of processing light, or reducing a processing spot diameter is known.

In order to perform high-quality fine processing, it is desirable not only to reduce a processing spot diameter, but also to irradiate a target object with an ideal circular processing beam, but rotationally asymmetric optical characteristics may occur depending on the manufacturing accuracy of optical members such as a lens and a mirror and a method of holding the optical members. Due to rotationally asymmetric optical characteristics, there is a problem that processing light becomes an ellipse at a focus position and a defocus position.

There are also a method of tightening the manufacturing accuracy of optical members and a method of holding the optical members that do not cause rotationally asymmetric optical characteristics, but there are limits to in terms of accuracy and cost, and the effects of rotationally asymmetric optical characteristics cannot be eliminated completely.

On the other hand, for example, in Japanese Patent Application Laid-Open No. 2002-273589, correction using a cylindrical lens is performed as a method of correcting rotationally asymmetric optical characteristics.

However, in a correction mechanism disclosed in Japanese Patent Application Laid-Open No. 2002-273589, the amount of rotationally asymmetric optical characteristics can be determined by adjusting a distance between two cylindrical lenses, but the orientation of the rotationally asymmetric optical characteristics cannot be determined.

Thus, in Japanese Patent Application Laid-Open No. 2002-273589, since the amount and orientation of rotationally asymmetric optical characteristics cannot be determined, a processing beam at a focus position and a defocus position does not have an ideal circular shape, and thus high-quality fine processing cannot be performed.

SUMMARY OF THE INVENTION

In order to achieve the object, a processing apparatus according to one aspect of the present invention is a processing apparatus including an optical device that guides a laser beam emitted from a light source to a target object, the processing apparatus processing the target object with light emitted from the optical device, in which the optical device includes a correction mechanism that corrects rotationally asymmetric optical characteristics of the optical device, the correction mechanism includes at least two optical elements with rotationally asymmetric power, and a mechanism that enables the at least two optical elements to rotate about their respective optical axes, the amount of rotationally asymmetric optical characteristics changes due to a rotation angle difference between the at least two optical elements, and a direction of the rotationally asymmetric optical characteristics changes depending on a common rotation angle of the at least two optical elements.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

First Embodiment

Figure 1:
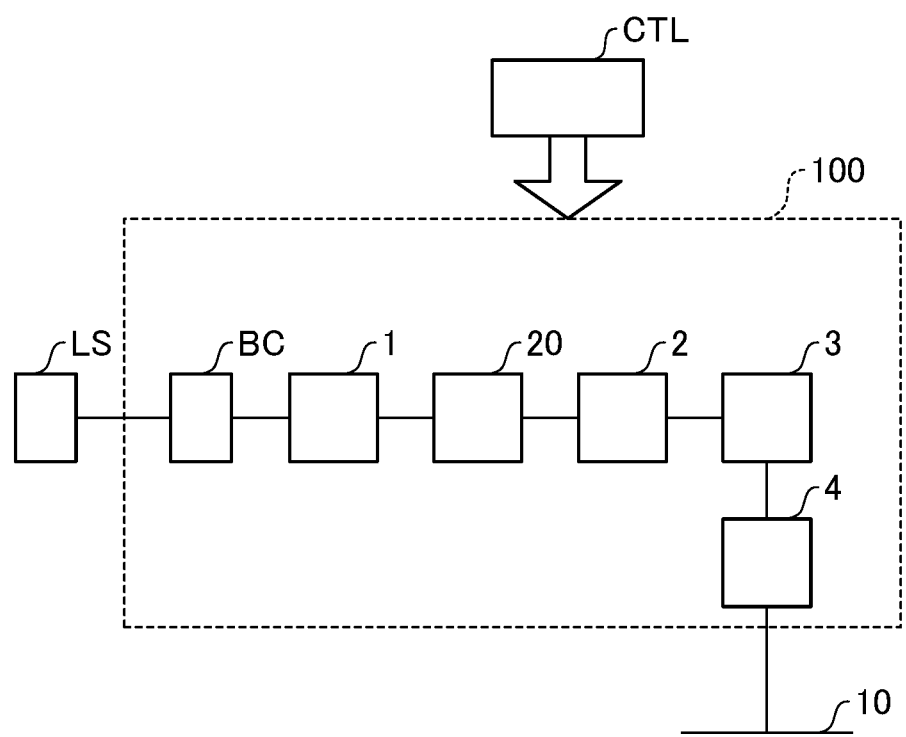
FIG. 1 is a diagram illustrating a configuration example of an optical device in a first embodiment.

FIG. 1 is a diagram illustrating a configuration example of an optical device in a first embodiment. A laser beam emitted from a laser light source LS passes through an optical device 100 and then is emitted to a target object 10. For example, BC denotes a beam adjustment mechanism that changes a beam diameter and a beam divergence angle of the laser beam emitted from the laser light source LS, and 1 denotes an inclination adjustment mechanism that inclines an incident optical axis of the laser beam with respect to a target object at an arbitrary angle.

2 denotes a focus position adjustment mechanism that shifts a focus position of a laser beam to an arbitrary position in the optical axis direction, 3 denotes a position adjustment mechanism that shifts an incident optical axis position of a laser beam with respect to a target object to an arbitrary position, and 4 denotes a light condensing mechanism 4 having a function of condensing a light beam.

In addition, the optical device 100 of the first embodiment includes the beam adjustment mechanism BC, the inclination adjustment mechanism 1, the focus position adjustment mechanism 2, the position adjustment mechanism 3, the light condensing mechanism 4, and the like, but may include at least one of these.

Further, in the optical device 100 of the first embodiment, a correction mechanism 20 that corrects rotationally asymmetric optical characteristics is provided between the inclination adjustment mechanism 1 and the focus position adjustment mechanism 2. CTL denotes a control device including a CPU as a computer and a memory storing a computer program. Driving amounts and driving timings of the inclination adjustment mechanism 1, the focus position adjustment mechanism 2, the position adjustment mechanism 3, and the like are controlled in response to a drive signal output from the control device CTL.

The inclination adjustment mechanism 1 and the position adjustment mechanism 3 are constituted by a plurality of mirror members having reflecting surfaces, and the inclination and position are adjusted by using either fixedly disposed mirror members or mirror members each having an angle variable mechanism. The fixedly disposed mirror members may be configured in a prism shape, or may be configured independently of each other.

The mirror member having an angle variable mechanism includes a galvanometer, and rotates the mirror member via an output shaft with a drive amount corresponding to a drive signal of the Galvanometer. The mirror member having an angle variable mechanism is not limited to a Galvanometer or the like as long as the mirror member can be set to a desired rotation angle.

The focus position adjustment mechanism 2 is constituted by a lens and a drive mechanism that drives the lens in the optical axis direction, and drives the lens in accordance with a focus position movement amount. The configuration is not limited to the above-described configuration as long as the focus position can be driven with a desired movement amount. The optical device 100 may also include measurement mechanisms such as a processed surface observation unit for observing a processed surface and an optical axis observation unit for observing the adjustment state of the optical axis.

The optical device 100 has rotationally asymmetric optical characteristics. A rotationally asymmetric optical characteristic is astigmatism. Factors that cause astigmatism include manufacturing accuracy of lenses and mirror members, and surface distortion due to holding of mirror members. In particular, the inclination adjustment mechanism 1 uses a large number of mirror members, and surface distortion or the like due to holding of the mirror members causes astigmatism.

Figure 2:
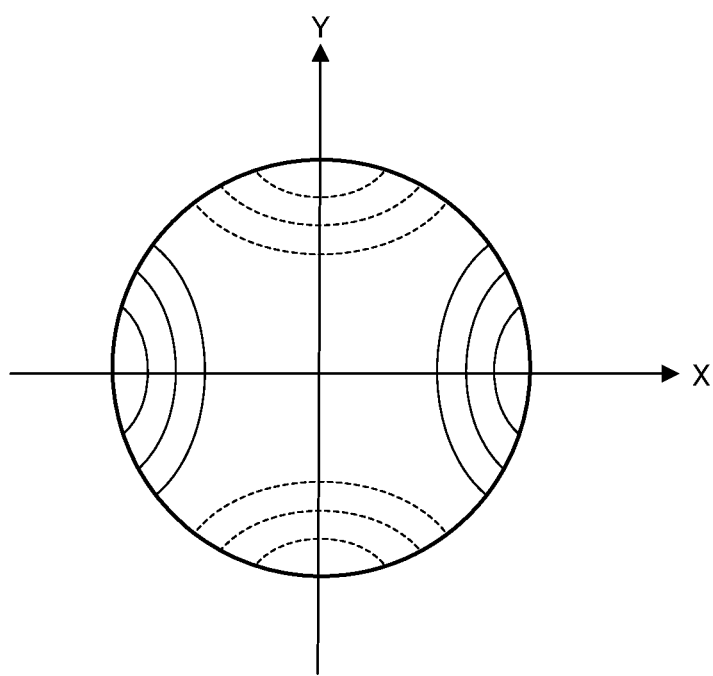
FIG. 2 is a diagram illustrating an example of typical astigmatism.

FIG. 2 is a diagram illustrating an example of typical astigmatism. Contour lines indicated by solid lines represent aberrations in the positive direction, and contour lines indicated by dashed lines represent aberrations in the negative direction. When astigmatism as illustrated in FIG. 2 occurs, positive power is generated in the X-axis direction and negative power is generated in the Y-axis direction orthogonal thereto. As a distance between a position where astigmatism occurs and a pupil plane increases, a beam diameter in the X-axis direction decreases and a beam diameter in the Y-axis direction increases.

As a result, at a light condensing position, not only an image plane difference occurs due to shifts of a focus position in the X direction and Y direction, but also a numerical aperture (NA) difference occurs in the X direction and the Y direction.

Although FIG. 2 illustrates an example in which an image plane difference and an NA difference occur in the X-axis direction and the Y-axis direction, the direction of astigmatism may occur in all directions with the optical axis as a rotation axis. When the direction of astigmatism rotates about the optical axis, an image plane difference or an NA difference occurs between two orthogonal axes in a direction corresponding to the direction of astigmatism.

In the first embodiment, for example, the correction mechanism 20 is disposed between the inclination adjustment mechanism 1 and the focus position adjustment mechanism 2 in order to correct the image plane difference and the NA difference. That is, the correction mechanism 20 is disposed immediately behind the inclination adjustment mechanism 1, which is constituted by a large number of mirror members as described above and tends to generate astigmatism.

This is because, when the correction mechanism 20 is disposed at a position distant from an astigmatism occurrence location, a beam becomes an ellipse at a point of in time when the beam is incident on the correction mechanism 20. When the correction mechanism 20 is disposed at such a position, a beam diameter difference between the X direction and the Y direction is not corrected even when the correction mechanism 20 corrects astigmatism, and thus an NA difference remains. On the other hand, since the astigmatism is not corrected even when the NA difference is corrected by the correction mechanism 20, the image plane difference remains.

Thus, in the first embodiment, for example, the correction mechanism 20 is disposed immediately behind the inclination adjustment mechanism 1 where astigmatism occurs before a beam becomes an ellipse to correct astigmatism, and thus both an image plane difference and an NA difference can be suppressed.

In the first embodiment, the inclination adjustment mechanism 1 is an optical mechanism that generates astigmatism (has rotationally asymmetric optical characteristics), but the present invention is not limited to this example. That is, other mechanisms may generate astigmatism, and the correction mechanism 20 of the first embodiment can also be applied to such mechanisms.

In the first embodiment, the correction mechanism 20 is disposed between an optical system (for example, the focus position adjustment mechanism 2) disposed immediately behind an optical mechanism (for example, the inclination adjustment mechanism 1) that generates astigmatism (has rotationally asymmetric optical characteristics) and the above-described optical mechanism (for example, the inclination adjustment mechanism 1).

However, the present invention is not limited to this example. That is, it is sufficient that a configuration in which the amount and direction of astigmatism can be cancelled by the optical mechanism (for example, the inclination adjustment mechanism 1) generating the astigmatism and the correction mechanism 20 is adopted.

Thus, the correction mechanism 20 may be disposed between the optical system (for example, the beam adjustment mechanism BC or other optical systems) disposed immediately in front of the optical mechanism (for example, the inclination adjustment mechanism 1) generating astigmatism and the above-described optical mechanism (for example, the inclination adjustment mechanism 1).

That is, it is sufficient that the correction mechanism 20 is disposed between an optical system that is disposed immediately in front of or after the optical mechanism (for example, the inclination adjustment mechanism 1) generating astigmatism and the above-described optical mechanism (for example, the inclination adjustment mechanism 1).

Alternatively, the correction mechanism 20 may be disposed inside (for example, between a plurality of mirrors) the above-described optical mechanism (for example, the inclination adjustment mechanism 1) that generates astigmatism (has rotationally asymmetric optical characteristics). It is desired that the correction mechanism 20 be disposed at a position (near) as close as possible to an astigmatism occurrence position.

Figure 3:
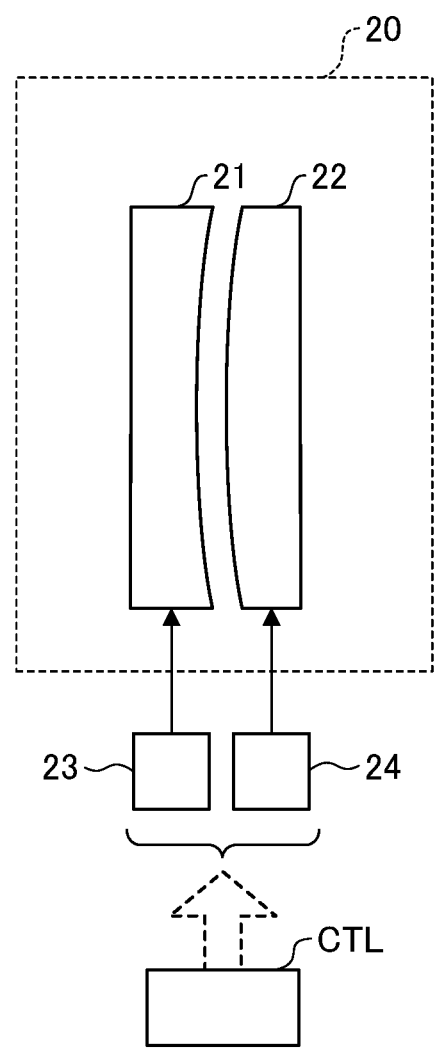
FIG. 3 is a diagram illustrating a configuration example of a correction mechanism in the first embodiment.

Next, the correction mechanism 20 will be described using FIG. 3. FIG. 3 is a diagram illustrating a configuration example of the correction mechanism of the first embodiment. FIG. 3 illustrates a cross section in a case where the correction mechanism 20 is taken along a plane including the optical axis.

In the first embodiment, the correction mechanism 20 includes at least two optical elements having rotationally asymmetric power, and each of the optical elements uses a toric lens in the first embodiment. The toric lenses include a first cylindrical lens 21 and a second cylindrical lens 22, each of which has a cylindrical surface on one side and a flat surface on the other side.

Further, a first rotation mechanism 23 and a second rotation mechanism 24 for respectively rotating the first cylindrical lens 21 and the second cylindrical lens 22 about the optical axis are provided. That is, each of at least two optical elements includes a mechanism that is rotatable about the optical axis as a rotation axis.

The first rotation mechanism 23 and the second rotation mechanism 24 can be adjusted manually or by the control device CTL. That is, the first rotation mechanism 23 and the second rotation mechanism 24 can be adjusted manually or in response to a control signal from the control device CTL by relatively rotating the first rotation mechanism 23 and the second rotation mechanism 24 so that an angle difference occurs. The first rotation mechanism 23 and the second rotation mechanism 24 can also be adjusted such that an angle difference does not change by rotating both the first rotation mechanism 23 and the second rotation mechanism 24 in the same direction at the same angle.

In this manner, in the first embodiment, a mechanism that relatively rotates the at least two optical elements and a mechanism that rotates the at least two optical elements in the same direction at the same angle are provided.

In the example of FIG. 3, the first cylindrical lens 21 has negative power and the second cylindrical lens 22 has positive power. Cylindrical surfaces of the first cylindrical lens 21 and the second cylindrical lens 22 are disposed to face each other, and the two cylindrical lenses are disposed in series in the optical axis direction.

In the first embodiment, when the focal length of the first cylindrical lens is F1, the focal length of the second cylindrical lens is F2, and a distance between the first cylindrical lens 21 and the second cylindrical lens 22 is D, the cylindrical lens is disposed to satisfy Equation 1.

$$F1+F2=D \qquad \text{(Equation 1)}$$

The order in which the cylindrical lens with positive power and the cylindrical lens with negative power are disposed in the optical axis direction does not matter. Both the first cylindrical lens 21 and the second cylindrical lens 22 may have positive power, or both may have negative power.

In the first embodiment, an output of the inclination adjustment mechanism 1 is substantially parallel light. Thus, the correction mechanism 20 that satisfies the relationship of Equation 1 is disposed between the inclination adjustment mechanism 1 and the focus position adjustment mechanism 2 disposed immediately behind the inclination adjustment mechanism 1, and combined power at the correction mechanism 20 is zero when the directions of the generatrix of the first cylindrical lens 21 and the generatrix of the second cylindrical lens 22 match each other. In this manner, optical characteristics do not change at all, which is equivalent to a case when parallel plates are disposed.

As a result of correction performed by the correction mechanism 20, when the position/angle of a beam incident on the target object 10 deviates from a target position/angle, it is sufficient that deviations from the target position/angle are adjusted by the inclination adjustment mechanism 1, the focus position adjustment mechanism 2, and the position adjustment mechanism 3. When a spot diameter at a light converging position is changed by the correction mechanism 20, it is sufficient that a beam diameter is adjusted by the beam adjustment mechanism BC.

Figure 4:
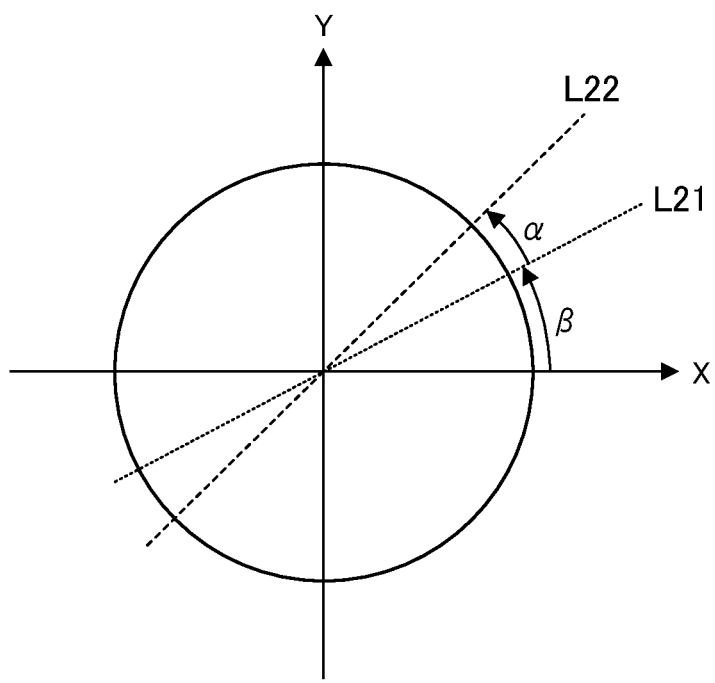
FIG. 4 is a diagram of a first cylindrical lens 21 and a second cylindrical lens 22 when viewed from an optical axis direction.

Next, an example of rotation angles of the first cylindrical lens 21 and the second cylindrical lens 22 will be described using FIG. 4. FIG. 4 is a diagram of the first cylindrical lens 21 and the second cylindrical lens 22 as viewed from the optical axis direction, and illustrates rotation angles after the amount and direction of astigmatism are corrected by the first cylindrical lens 21 and the second cylindrical lens 22.

Before the amount and direction of astigmatism are adjusted, it is assumed that the generatrix of the first cylindrical lens 21 and the generatrix of the second cylindrical lens 22 match the X-axis. In the process of adjusting the amount and direction of astigmatism, the first cylindrical lens 21 is rotated by R degrees and the second cylindrical lens 22 is rotated by $(\alpha+\beta)$ degrees with the optical axis as the rotation axis.

After the rotation, the generatrix of the first cylindrical lens 21 is L21, and the generatrix of the second cylindrical lens 22 is L22.

A process of determining a rotation angle will be described in detail. The first cylindrical lens 21 and the second cylindrical lens 22 have a relative rotation angle difference $\alpha$. Astigmatism occurs in accordance with the rotation angle difference $\alpha$. The greater the rotation angle difference $\alpha$, the greater the astigmatism, and a maximum astigmatism occurs when the generatrix L21 of the first cylindrical lens 21 and the generatrix L22 of the second cylindrical lens 22 are orthogonal to each other at $\alpha=90$ degrees.

Thus, the first cylindrical lens 21 and the second cylindrical lens 22 are rotated such that the amount of astigmatism occurring due to the rotation angle difference $\alpha$ between the first cylindrical lens 21 and the second cylindrical lens 22 matches astigmatism amount desired to be corrected. That is, in the first embodiment, a rotationally asymmetric optical characteristic amount (the amount of astigmatism, an image plane difference between the XY axes due to astigmatism, or the like) is corrected using a rotation angle difference between at least two optical elements.

Since astigmatism has an orientation as well as an amount, the astigmatism cannot be corrected only with the rotation angle difference $\alpha$. Consequently, the first cylindrical lens 21 and the second cylindrical lens 22 are simultaneously rotated by a common rotation angle R while maintaining the rotation angle difference $\alpha$ between the first cylindrical lens 21 and the second cylindrical lens 22. Thereby, the direction of astigmatism can be changed in accordance with to the common rotation angle R while the amount of astigmatism is maintained.

Thus, both the first cylindrical lens 21 and the second cylindrical lens 22 are rotated by the common rotation angle in a direction in which the astigmatism desired to be corrected is cancelled. That is, in the first embodiment, the direction of rotationally asymmetric optical characteristics is corrected using the common rotation angle of at least two optical elements.

In the first embodiment, after the second cylindrical lens 22 is rotated by a degrees relative to the first cylindrical lens 21, the first cylindrical lens 21 and the second cylindrical lens 22 are simultaneously rotated by the common rotation angle of 0 degrees. However, the present invention is not limited to such a procedure.

For example, when the amount of astigmatism can be determined at the rotation angle difference of a degrees between the first cylindrical lens 21 and the second cylindrical lens 22, and the direction of astigmatism can be determined at the common rotational angle of 0 degrees, the first cylindrical lens 21 and the second cylindrical lens 22 may be rotated independently of each other.

Although a case where the mechanism that generates astigmatism is, for example, only the inclination adjustment mechanism 1 has been described in the first embodiment, the present invention is not limited to this example, and when there are a plurality of mechanisms that generate astigmatism, it is sufficient that, for example, a correction mechanism is disposed immediately in front of or behind each mechanism that generates astigmatism.

In the first embodiment, a case where the optical element having rotationally asymmetric power is an optical element having a cylindrical surface on one side and a flat surface on the other side has been described. However, the present invention is not limited to this example, and an optical element having any configuration may be used as long as it is an optical element that generates astigmatism by relatively rotating the optical element.

Although an example in which two optical elements having rotationally asymmetric power are used in the correction mechanism has been described in the first embodiment, the present invention is not limited to this example, and the number of optical elements may be two or more.

As described above, according to the first embodiment, the correction mechanism 20 is disposed in the vicinity of a position where astigmatism occurring by the inclination adjustment mechanism 1 or the like occurs, the amount of astigmatism is determined in accordance with a rotation angle difference between at least two optical elements, and the direction of astigmatism is adjusted by a common rotation angle. Thereby, it is possible to realize an optical device capable of suppressing an image plane difference and an NA difference while correcting astigmatism.

Second Embodiment

Figure 5:
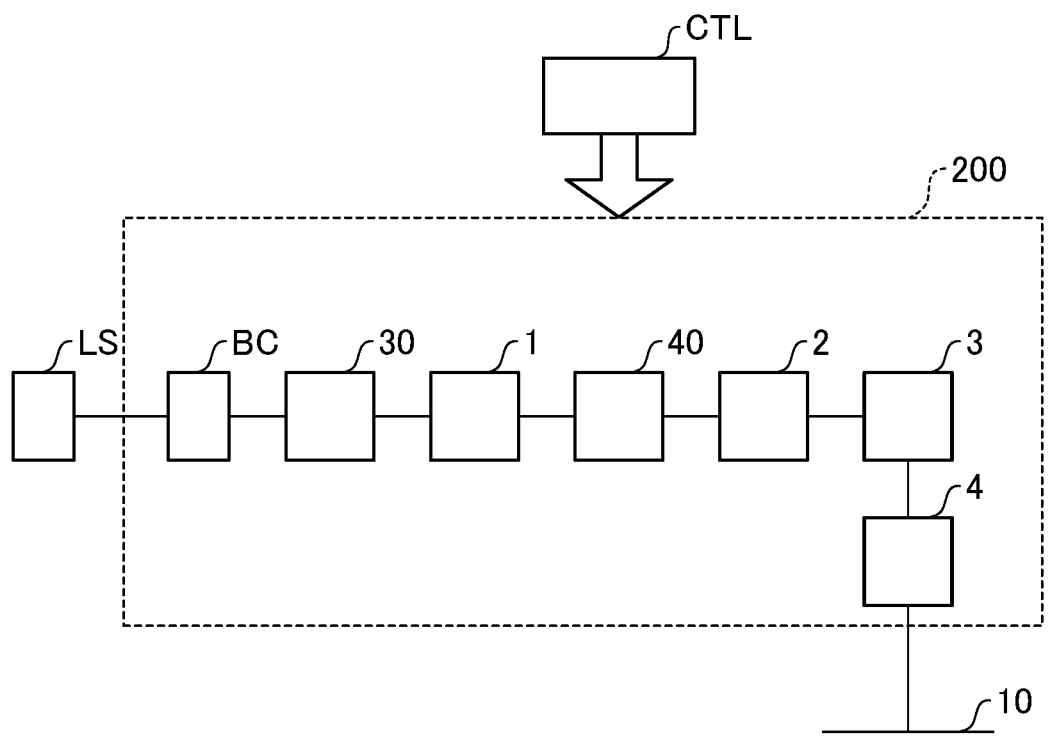
FIG. 5 is a diagram illustrating a configuration example of an optical device in a second embodiment.
Figure 6:
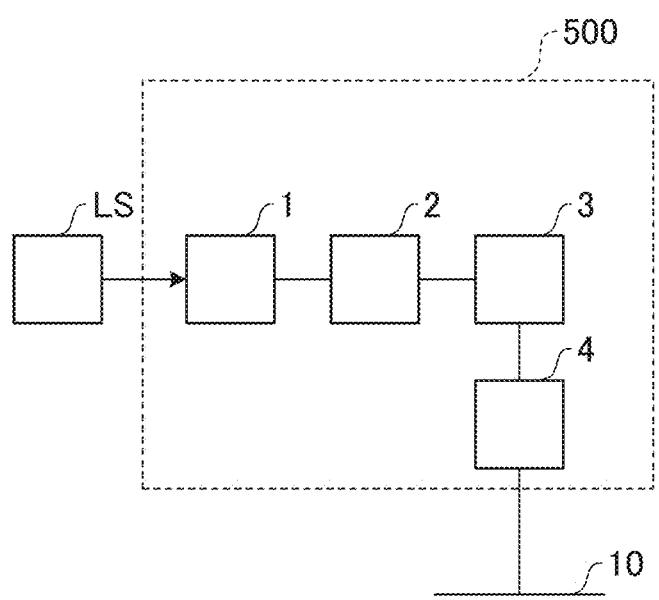
FIG. 6 is a diagram illustrating an optical device of the related art.

FIG. 5 is a diagram illustrating a configuration example of an optical device in a second embodiment. The second embodiment relates to a configuration in which correction can be performed even when there is no space for disposing a correction mechanism in the vicinity of a mechanism that generates astigmatism, or even when there are a plurality of mechanisms that generate astigmatism and it is difficult to dispose a correction mechanism for each mechanism that generates astigmatism.

That is, a configuration example in which an image plane difference and an NA difference caused by astigmatism can be corrected even in the above-described case is described.

A laser light emitted from a laser light source LS passes through an optical device 200 and then is emitted to a target object 10. The optical device 200 includes an inclination adjustment mechanism 1 that inclines an incident optical axis of the laser beam with respect to the target object at an arbitrary angle, and a focus position adjustment mechanism 2 that shifts a focus position of a laser beam to an arbitrary position in the optical axis direction.

The optical device 200 also includes a position adjustment mechanism 3 that shifts an incident optical axis position of the laser beam with respect to the target object to an arbitrary position. Further, the optical device 200 includes a light condensing mechanism 4 having a function of condensing a laser beam.

Driving amounts and driving timings of the inclination adjustment mechanism 1, the focus position adjustment mechanism 2, the position adjustment mechanism 3, and the like are controlled in response to a drive signal output from a control device CTL. The optical device 200 of the second embodiment further includes correction mechanisms 30 and 40 that correct rotationally asymmetric optical characteristics.

The positions of the correction mechanisms 30 and 40 may be separated from a position where astigmatism occurring by the inclination adjustment mechanism 1 or the like occurs. Further, the positions of the correction mechanisms 30 and 40 disposed and the order of arrangement thereof are not limited to this example.

The optical device 200 may include a beam adjustment mechanism BC that changes a beam diameter of a laser beam emitted from the laser light source LS. Furthermore, the optical device 200 may include a measurement mechanism such as a processed surface observation unit and an optical axis observation unit.

The correction mechanism 30 includes a first cylindrical lens and a second cylindrical lens that are not illustrated in the drawing. The correction mechanism 40 also includes a first cylindrical lens and a second cylindrical lens that are not illustrated in the drawing. The correction mechanism 30 and the correction mechanism 40 have different roles, the correction mechanism 30 has a function of correcting an NA difference, and the correction mechanism 40 has a function of correcting an image plane difference.

The correction mechanism 30 for correcting an NA difference determines the amount of NA difference based on a rotation angle difference between the first cylindrical lens and the second cylindrical lens, and determines a direction in which the NA difference occurs based on a common rotation angle. The correction mechanism 40 for correcting an image plane difference determines the amount of image plane difference based on a rotation angle difference between the first cylindrical lens and the second cylindrical lens, and determines a direction in which the image plane difference occurs based on a common rotation angle.

As described above, in the second embodiment, adjustment is performed using a combination of the correction mechanism 30 (first correction mechanism) for correcting an NA difference and the correction mechanism 40 (second correction mechanism) for correcting an image plane difference.

Thus, sufficient correction can be performed even when there is no space for disposing a correction mechanism in the vicinity of a mechanism that generates astigmatism, or even when it is difficult to dispose a correction mechanism for each mechanism that generates astigmatism because there are a plurality of mechanisms generating astigmatism. That is, it is possible to provide an optical device that reduces an image plane difference and an NA difference while allowing the degree of freedom in the arrangement positions of the first correction mechanism and the second correction mechanism.

Third Embodiment

An example of a processing apparatus according to a third embodiment will be described, the processing apparatus processing a target object 10 with light emitted from the optical device according to the first embodiment or the second embodiment described above.

In the processing apparatus using the optical device according to the first embodiment, light emitted from the laser light source LS is adjusted to guide a light beam to a target position on the target object 10 through the inclination adjustment mechanism 1, the correction mechanism 20, the focus position adjustment mechanism 2, and the position adjustment mechanism 3.

Further, in the processing apparatus using the optical device according to the second embodiment, light emitted from the laser light source is adjusted by the correction mechanism 30, the inclination adjustment mechanism 1, the correction mechanism 40, the focus position adjustment mechanism 2, and the position adjustment mechanism 3 to guide a light beam to a target position on the target object 10.

As a result, it is possible to correct rotationally asymmetric optical characteristics by determining the amount of rotationally asymmetric optical characteristics and the direction of the rotationally asymmetric optical characteristics by the correction mechanism and to form a processed beam close to an ideal circle at a focus position and a defocus position. Thus, it is possible to realize a processing apparatus capable of performing high-quality fine processing (desired hole processing such as straight hole processing, tapered hole processing, free-form hole processing, cutting, and the like).

Fourth Embodiment

An example of an article manufacturing method using the processing apparatus according to the third embodiment will be described. The article manufacturing method includes a processing step of processing an object (target object) using the processing apparatus, and a machining step of machining the target object processed in the processing step, and it is possible to manufacture an article from the target object machined in the machining step.

The machining step may include, for example, at least one machining different from the processing among processing, transportation, inspection, sorting, assembling (mounting), and packaging. Compared to a method of the related art, the article manufacturing method in the fourth embodiment can make a processing beam having a circular shape, and thus it is advantageous in terms of article performance, quality, productivity, production cost, and the like.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

This application claims the benefit of Japanese Patent Application No. 2022-156073, filed on Sep. 29, 2022, which is hereby incorporated by reference herein in its entirety.

What is claimed is:

1. A processing apparatus comprising:
an optical device that guides a laser beam emitted from a light source to a target object, the processing apparatus processing the target object with light emitted from the optical device,
wherein the optical device includes a correction mechanism that corrects rotationally asymmetric optical characteristics of the optical device,
the correction mechanism includes at least two optical elements with rotationally asymmetric power, and a mechanism that enables the at least two optical elements to rotate about their respective optical axes,
the amount of rotationally asymmetric optical characteristics changes due to a rotation angle difference between the at least two optical elements, and
a direction of the rotationally asymmetric optical characteristics changes depending on a common rotation angle of the at least two optical elements.

2. The processing apparatus according to claim 1, further comprising:
an inclination adjustment mechanism that inclines an incident optical axis of the laser beam with respect to the target object at an arbitrary angle;
a focus position adjustment mechanism that shifts a focus position of the laser beam to an arbitrary position in an optical axis direction; and
a position adjustment mechanism that shifts an incident optical axis position of the laser beam with respect to the target object to an arbitrary position.

3. The processing apparatus according to claim 2, wherein the correction mechanism is disposed inside the optical mechanism having the rotationally asymmetric optical characteristics, or between the optical mechanism an optical system disposed immediately in front of or behind the optical mechanism.

4. The processing apparatus according to claim 3, wherein the optical mechanism is the inclination adjustment mechanism.

5. The processing apparatus according to claim 1, wherein the correction mechanism includes a mechanism that relatively rotates the at least two optical elements, and a mechanism that rotates the at least two optical elements in the same direction at the same angle.

6. The processing apparatus according to claim 1, wherein the at least two optical elements include toric lenses, respectively.

7. The processing apparatus according to claim 6, wherein the at least two optical elements include a cylindrical lens having negative power and a cylindrical lens having positive power.

8. The processing apparatus according to claim 7, wherein a distance D between the cylindrical lens having negative power and the cylindrical lens having positive power satisfies $F1+F2=D$, where F1 and F2 denote focal lengths of the respective cylindrical lenses.

9. The processing apparatus according to claim 1, wherein the correction mechanism includes a first correction mechanism for correcting an NA difference in the optical characteristics and a second correction mechanism for correcting an image plane difference in the optical characteristics.

10. An article manufacturing method using a processing apparatus including an optical device that guides a laser beam emitted from a light source to a target object and processing the target object with light emitted from the optical device,
wherein the optical device includes a correction mechanism that corrects rotationally asymmetric optical characteristics of the optical device,
the correction mechanism includes at least two optical elements with rotationally asymmetric power, and a mechanism that enables the at least two optical elements to rotate about their respective optical axes, the optical device is configured such that the amount of rotationally asymmetric optical characteristics changes due to a rotation angle difference between the at least two optical elements, and a direction of the rotationally asymmetric optical characteristics changes depending on a common rotation angle of the at least two optical elements, the article manufacturing method comprises:

processing a target object with light emitted from the optical device; and machining the processed target object, and an article is manufactured from the target object machined in the machining of the processed target object.

\* \* \* \* \*